G. H. BARBOUR.
APPARATUS FOR FORMING METAL REINFORCED COMPOSITE SLABS.
APPLICATION FILED DEC. 23, 1908.
1,079,738.
Patented Nov. 25, 1913.
2 SHEETS—SHEET 1.
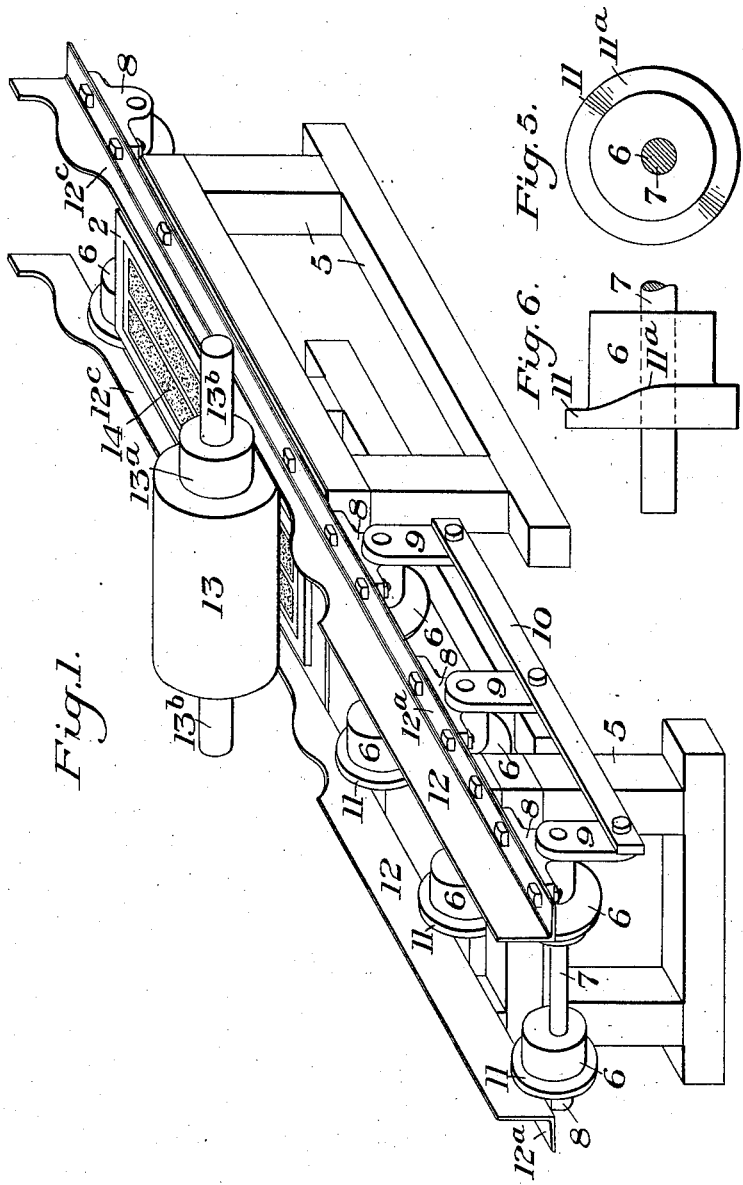
WITNESSES
INVENTOR G. H. BARBOUR.
APPARATUS FOR FORMING METAL REINFORCED COMPOSITE SLABS.
APPLICATION FILED DEC. 23, 1908.
1,079,738.
Patented Nov. 25, 1913.
2 SHEETS—SHEET 2.
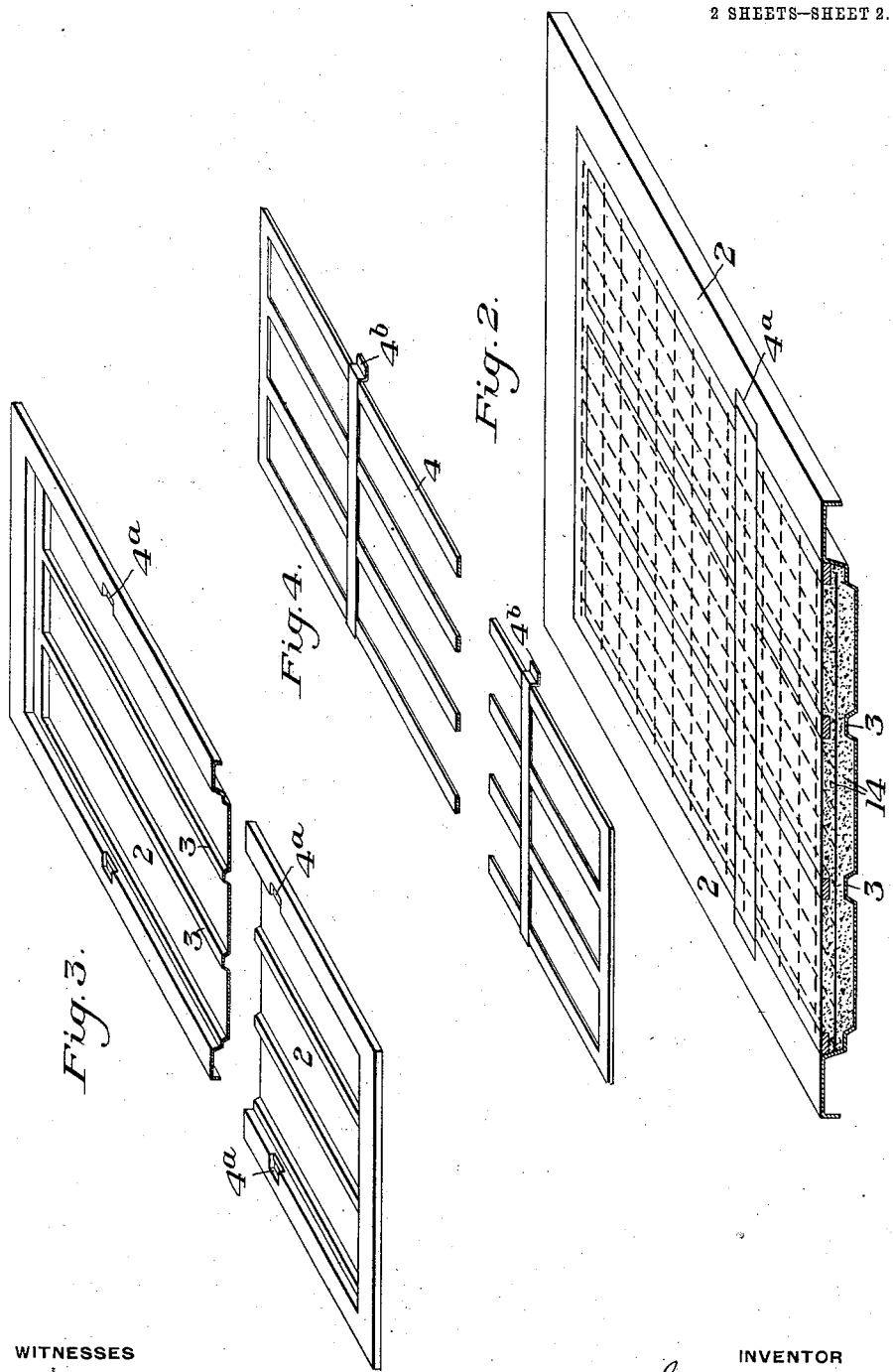
WITNESSES
INVENTOR

UNITED STATES PATENT OFFICE.

GEORGE H. BARBOUR, OF PITTSBURGH, PENNSYLVANIA.

APPARATUS FOR FORMING METAL-REINFORCED COMPOSITE SLABS.

1,079,738. Specification of Letters Patent. Patented Nov. 25, 1913.

Application filed December 23, 1908. Serial No. 469,027.

*To all whom it may concern:*

Be it known that I, GEORGE H. BARBOUR, of Pittsburgh, Allegheny county, Pennsylvania, have invented a new and useful Apparatus for Forming Metal - Reinforced Composite Slabs, of which the following is a full, clear, and exact description, reference being had to the accompanying drawings, forming part of this specification, in which—

Figure 1 is a perspective view showing one form of apparatus constructed in accordance with my invention; Fig. 2 is a perspective view partly in section showing the slab in the mold or pallet; Fig. 3 is a similar perspective view showing a pallet formed by stamping or pressing out of a sheet or plate of metal; Fig. 4 is a perspective view showing the grid used in connection with the pallet in making one type or form of slab; and Figs. 5 and 6 are details, on a larger scale showing the construction of the rollers on the molding machine forming part of my improved apparatus.

My invention relates to an apparatus for making composition slabs formed of concrete or other plastic materials in which expanded metal, bars, wire mesh or other metal reinforcing members are embedded.

The object of the invention is to provide an improved composition slab having metal reinforcement and which may be provided with depressions in one face or in opposite faces of such a depth that wires, nails or staples for connecting purposes can be driven or forced through without endangering or cracking the slab and to provide an improved apparatus for manufacturing such slabs from plastic materials by which the slabs are easily and cheaply made and to provide new and novel apparatus whereby such slabs are quickly made and formed into the desired shape, section and size.

Another object of the invention is to provide the apparatus with agitating mechanism which is adapted to be operated by hand or by power means.

In the drawings, 2 represents the pallet or mold, preferably constructed of metal, in which the plastic materials are placed and which as shown is provided with ribs or projections 3 formed to give to the surface of one side of the slab the desired contour and 4 is a grid used in connection with the pallet 2 for forming depressions in the other side of the slab and to regulate and fix the thickness of the slabs.

The frame 5 of the molding machine is provided with a series of rollers 6 of peculiar construction secured eccentrically upon their shafts 7 and the shafts 7 which are mounted in bearings 8 are provided with cranks 9 by which they are connected to the arm or connecting lever 10. The rollers 6 are provided with annular flanges 11 having cam surfaces 11$^a$ for a purpose described hereinafter.

On the longitudinal sides of the frame 5 and at the ends of the rollers 6 are the angles 12, to the horizontal legs 12$^a$ of which the roller bearings 8 are secured. The leg 12 of these angles extends vertically, its edge 12$^c$ forming a curved track for the forming roll 13 by which the plastic materials are spread and are packed into the pallet 2. The roller 13 is provided with reduced shoulder portions 13$^a$ which contact with the edges 12 of the angles and with handles 13$^b$ by which the roller is moved back and forth above the pallet in forming the slabs.

When forming the slabs or blocks by my improved apparatus, a sufficient quantity of the pallets 2 and grids 4 may be provided to enable the plastic slabs to be dried in place in the pallets before being removed.

In forming the slabs by the use of my improved apparatus, an empty pallet 2 is first placed upon the rollers 6 at one end of the plate or frame 5 or on a roller table leading to the frame. The metal reinforcing material 14 to be embedded in the slabs, after being cut to the desired length and width, is then placed in position in the pallet. The marginal edges of the metal reinforcing material engage with and rest on the grooves or rabbets in the sides of the pallet. The grid 4 is then placed in position on the pallet, the top surface of the pallet being provided with suitable recesses 4$^a$ for the reception of the projections 4$^b$ on the grid 4 to hold the grid in place in the pallet. The pallet or mold 2 is then filled with semifluid plastic materials such as concrete. The pallet 2 is preferably resting upon the eccentric rollers 6 and these rollers are rocked or rotated by the connecting rod or arm 10, the arm being manipulated by hand or, when desired, being connected to a suitable power motor. As the rollers 6 are moved, either by rocking or rotating, the pallet is moved back and forth on the rollers, the eccentric surfaces of these rollers also alternately raising and lowering the pallet. At the same time, the cam surface 11ª on the flanges 11 of the rollers will cause the pallet 2 to move sidewise in alternately opposite directions.

By moving the pallet alternately in opposite directions both longitudinally and vertically, as well as transversely, the plastic materials are shaken and are evenly distributed over the inner surface of the pallet. Any excess plastic materials are removed after the shaking operation by means of a suitable scraper. The pallet 2 with its grid 4 and the partly completed slab is then moved forward by the rollers 6 until it is resting on the frame 5 beneath the reduced portions 12ᶜ of the track for the roller 13. The roller 13 is then caused to pass back and forth over the top of the grid, the weight of the roller resting upon the plastic materials and grid. This operation gradually compacts the plastic materials and brings the slab to the desired thickness. When the required thickness has been reached, the reduced shoulder portions 13ª of the roller 13 will be in engagement with the low portions of the curved track for this roller and the roller is then moved along its track until it has been lifted out of engagement with the grid and slab. After the forming operation is completed, the pallet is removed from the forming machine to the point at which it is dried sufficiently to be handled and be removed from the pallet. When the slab has been formed and removed in its pallet, an empty pallet is then placed in position on the forming machine or table and the above described operations are again repeated with successive pallets in making the slabs.

Slabs of any length and width and of any desired thickness may be made by my improved method, the apparatus shown being adapted to make slabs up to such weight as can be easily handled by one man.

Preferably the forming table or frame is placed at a suitable point in the length of a roller feed table, the rollers of the table on one end of the forming machine supplying the pallet to it, the rollers on the opposite end receiving the pallets containing the formed slabs and delivering them to drying racks or other point of disposal.

The advantages of my invention will be apparent to those skilled in the art. By my improved apparatus the composition slabs are easily and cheaply made without the employment of skilled labor. The slabs are formed to an exact thickness and weight. The size of the slabs so formed is constant and waste of materials is thereby avoided and prevented. The apparatus for forming the slabs is simple and is easily manipulated and kept in repair.

Modifications in the construction and arrangement of the apparatus and in the size and shape of the slabs may be made without departing from my invention. The materials may be compressed by passing the loaded pallet between two rollers or by passing it while upon a movable table under a fixed roller.

I claim:—

1. Apparatus for forming composite slabs, comprising a pallet in which the materials are shaped while plastic, a pressing device for pressing said materials, mechanism for moving the pallet toward the pressing device and simultaneously moving it up and down to distribute the material therein, said mechanism being adapted to retain the pallet in a horizontal plane during such movement, so that the material will be evenly distributed in the pallet; substantially as described.

2. Apparatus for forming composite slabs, comprising a pallet in which the materials are shaped while plastic, a pressing device for pressing said materials, mechanism for moving the pallet toward the pressing device and simultaneously moving the pallet back and forth across said mechanism and also up and down to distribute the material therein, said mechanism being adapted to retain the pallet in a horizontal plane during such movement so that the material will be equally distributed in the pallet; substantially as described.

3. An apparatus for forming slabs of plastic materials in a pallet comprising a shaking device and a pressing device, said shaking device having a plurality of eccentrically mounted rollers, each of said rollers having cams for moving the pallet back and forth across said rollers, and actuating connections for said rollers, said rollers being connected to said actuating mechanism in timed relation so that the pallet will always be maintained in a horizontal position while being moved across said rollers toward the pressing device; substantially as described.

4. In apparatus for forming composite slabs, a pallet arranged to shape plastic materials placed therein, a shaking table on which the pallet is placed, said shaking table having eccentrically mounted rollers adapted to be oscillated to move the pallet endwise and up and down, means for oscillating said rollers, said rollers being timed so that the pallet will always be held in a horizontal plane in order to equally distribute the material placed therein, means for moving the pallet back and forth across said rollers; substantially as described.

In testimony whereof, I have hereunto set my hand.

GEORGE H. BARBOUR.

Witnesses:
 A. F. TIBBETTS,
 H. M. CORWIN.

Copies of this patent may be obtained for five cents each, by addressing the "Commissioner of Patents, Washington, D. C."